(12) United States Patent
Ballantine et al.

(10) Patent No.: US 12,394,991 B2
(45) Date of Patent: Aug. 19, 2025

(54) SYSTEMS AND CIRCUITS FOR CONNECTING COMPONENTS OF A HYDROGEN PLANT TO A POWER SOURCE

(71) Applicant: Ohmium International, Inc., Incline Village, NV (US)

(72) Inventors: Arne Ballantine, Incline Village, NV (US); Anil Kumar Adapa, Tadepalligudem (IN); Chockkalingam Karuppaiah, Fremont, CA (US)

(73) Assignee: Ohmium International, Inc., Newark, CA (US)

( * ) Notice: Subject to any disclaimer, the term of this patent is extended or adjusted under 35 U.S.C. 154(b) by 0 days.

(21) Appl. No.: 18/380,083

(22) Filed: Oct. 13, 2023

(65) Prior Publication Data

US 2024/0124989 A1    Apr. 18, 2024

Related U.S. Application Data

(60) Provisional application No. 63/416,290, filed on Oct. 14, 2022.

(51) Int. Cl.
*H02J 5/00* (2016.01)
*H02J 3/38* (2006.01)
*H02J 9/06* (2006.01)

(52) U.S. Cl.
CPC ........ *H02J 5/00* (2013.01); *H02J 3/38* (2013.01); *H02J 9/06* (2013.01)

(58) Field of Classification Search
CPC .............. H02J 3/38; H02J 9/06; H02J 5/00
See application file for complete search history.

(56) References Cited

U.S. PATENT DOCUMENTS

| 6,351,106 B1 | 2/2002 | Kramer et al. |
| 8,669,499 B2 | 3/2014 | Conrad |

(Continued)

FOREIGN PATENT DOCUMENTS

| CN | 104426351 A | 3/2015 |
| CN | 104956581 A | 9/2015 |

(Continued)

OTHER PUBLICATIONS

PCT Application No. PCT/US23/18822 International Search Report and Written Opinion dated Aug. 31, 2023.

(Continued)

*Primary Examiner* — Adi Amrany
(74) *Attorney, Agent, or Firm* — Polsinelli LLP

(57) ABSTRACT

The present disclosure relates to circuits for connecting components of a hydrogen plant to a power grid to power the components in an efficient manner. In one implementation, power-side alternate current (AC) to direct current (DC) converters may be connected to a source power grid without the need for an isolation transformer by providing separate buses between the power-side AC-DC converters and load-side DC-DC converters instead of a shared DC bus between the converters. Other implementations for connecting components of a hydrogen plant to a power grid may include an adjustable transformer, such as a tappable transformer or an autotransformer, to connect any number of auxiliary loads of the plant to the power grid. The adjustable transformer may provide for various types of auxiliary load devices to connect to the power provided by the transformer at the same time, including both three-phase devices and one-phase devices.

16 Claims, 4 Drawing Sheets

(56) References Cited

U.S. PATENT DOCUMENTS

| | | | |
|---|---|---|---|
| 8,936,704 | B1 | 1/2015 | Li |
| 9,461,319 | B2 | 10/2016 | Sudhan et al. |
| 9,461,320 | B2 | 10/2016 | Ballantine et al. |
| 9,885,759 | B2* | 2/2018 | Schipfer ............ G01R 31/364 |
| 10,573,910 | B2 | 2/2020 | Sudhan et al. |
| 10,811,975 | B1* | 10/2020 | Bala .................... H02M 3/155 |
| 12,166,373 | B2* | 12/2024 | Utz ..................... H02M 1/007 |
| 2004/0199294 | A1 | 10/2004 | Fairlie et al. |
| 2007/0179672 | A1 | 8/2007 | Fairlie et al. |
| 2009/0048716 | A1 | 2/2009 | Marhoefer |
| 2009/0189445 | A1* | 7/2009 | Strizki ................... H02J 7/34 |
| | | | 307/21 |
| 2009/0303762 | A1 | 12/2009 | Jang et al. |
| 2010/0114395 | A1 | 5/2010 | Hinatsu et al. |
| 2011/0155583 | A1 | 6/2011 | Li |
| 2013/0168236 | A1 | 7/2013 | Zadeh et al. |
| 2013/0201729 | A1 | 8/2013 | Ahsanuzzaman et al. |
| 2014/0021785 | A1 | 1/2014 | Munier et al. |
| 2014/0079593 | A1 | 3/2014 | Naito et al. |
| 2015/0001092 | A1 | 1/2015 | Preston et al. |
| 2015/0072257 | A1 | 3/2015 | Mata et al. |
| 2015/0293179 | A1* | 10/2015 | Schipfer ........... H01M 10/4285 |
| | | | 324/426 |
| 2016/0013729 | A1* | 1/2016 | Josse ...................... H02J 7/35 |
| | | | 363/126 |
| 2016/0060776 | A1 | 3/2016 | Kawajiri et al. |
| 2016/0244890 | A1 | 8/2016 | Petipas et al. |
| 2019/0245432 | A1 | 8/2019 | Yan et al. |
| 2019/0259088 | A1 | 8/2019 | Cooper |
| 2019/0288539 | A1 | 9/2019 | Vela Garcia |
| 2019/0296403 | A1 | 9/2019 | Ballantine et al. |
| 2019/0310215 | A1 | 10/2019 | Ballantine et al. |
| 2019/0312317 | A1 | 10/2019 | Ballantine et al. |
| 2019/0317151 | A1 | 10/2019 | Ballantine et al. |
| 2019/0317152 | A1 | 10/2019 | Ballantine et al. |
| 2020/0010961 | A1 | 1/2020 | Kazuno et al. |
| 2020/0295594 | A1* | 9/2020 | Reimann ................. H02H 7/28 |
| 2021/0155491 | A1 | 5/2021 | Ballantine et al. |
| 2021/0156038 | A1 | 5/2021 | Ballantine et al. |
| 2021/0156039 | A1 | 5/2021 | Ballantine et al. |
| 2021/0179996 | A1 | 6/2021 | Nygren et al. |
| 2021/0317588 | A1* | 10/2021 | Falk ........................ C25B 1/04 |
| 2021/0363651 | A1* | 11/2021 | Seymour ............... H02M 7/219 |
| 2021/0384815 | A1 | 12/2021 | Kolar et al. |
| 2021/0404078 | A1 | 12/2021 | Srinivasan |
| 2022/0065162 | A1* | 3/2022 | Hunt ....................... F02C 3/20 |
| 2022/0108262 | A1 | 4/2022 | Cella et al. |
| 2022/0220620 | A1 | 7/2022 | Dykstra et al. |
| 2023/0050530 | A1* | 2/2023 | Unru ................... H02M 1/0025 |
| 2023/0198247 | A1* | 6/2023 | Putz ...................... C25B 15/00 |
| | | | 361/93.1 |
| 2023/0223861 | A1 | 7/2023 | Everts |
| 2023/0231162 | A1 | 7/2023 | Ballantine et al. |
| 2023/0243055 | A1 | 8/2023 | Pmsvvsv |
| 2023/0302954 | A1* | 9/2023 | Inoue ................... H02M 3/285 |
| 2023/0332311 | A1 | 10/2023 | Karuppaiah et al. |
| 2023/0332312 | A1 | 10/2023 | Karuppaiah et al. |
| 2023/0332313 | A1 | 10/2023 | Karuppaiah et al. |
| 2023/0332315 | A1 | 10/2023 | Karuppaiah et al. |
| 2023/0332316 | A1 | 10/2023 | Karuppaiah et al. |
| 2023/0333530 | A1 | 10/2023 | Karuppaiah |
| 2023/0335990 | A1 | 10/2023 | Aghatehrani et al. |
| 2023/0352934 | A1* | 11/2023 | Steimer ................... H02M 3/01 |
| 2024/0352608 | A1 | 10/2024 | Srinivasan et al. |

FOREIGN PATENT DOCUMENTS

| | | |
|---|---|---|
| CN | 110445365 A | 11/2019 |
| CN | 114337322 A | 4/2022 |
| CN | 115204929 A | 10/2022 |
| CN | 115358806 A | 11/2022 |
| CN | 115796487 A | 3/2023 |
| CN | 115940284 A | 4/2023 |
| CN | 116109037 A | 5/2023 |
| EP | 4172606 A1 | 5/2023 |
| EP | 4511530 | 2/2025 |
| EP | 4511893 | 2/2025 |
| JP | 2015-050934 | 3/2015 |
| JP | 2017-220963 | 12/2017 |
| JP | 2018-066626 | 4/2018 |
| JP | 2019170097 A | 10/2019 |
| JP | 2023531491 A | 7/2023 |
| KR | 101452642 B1 | 10/2014 |
| KR | 20170046417 A | 5/2017 |
| KR | 102306918 B1 | 9/2021 |
| TW | 561673 B | 11/2003 |
| TW | 200633356 A | 9/2005 |
| TW | 202219500 A | 5/2022 |
| WO | 2018236649 A1 | 12/2018 |
| WO | 2020051557 A1 | 3/2020 |
| WO | 2021263231 A1 | 12/2021 |
| WO | 2023104267 A1 | 6/2023 |
| WO | 2023141219 A2 | 7/2023 |
| WO | 2023205079 A1 | 10/2023 |
| WO | 2023205082 A1 | 10/2023 |
| WO | 2023205090 A1 | 10/2023 |
| WO | 2023205104 A1 | 10/2023 |
| WO | 2023205126 A1 | 10/2023 |
| WO | 2023205139 A1 | 10/2023 |
| WO | 2023205154 A1 | 10/2023 |
| WO | 2024081426 A1 | 4/2024 |

OTHER PUBLICATIONS

PCT Application No. PCT/US23/18934 International Search Report and Written Opinion dated Aug. 31, 2023.
PCT Application No. PCT/US23/18911 International Search Report and Written Opinion dated Jul. 27, 2023.
PCT Application No. PCT/US23/18877 International Search Report and Written Opinion dated Aug. 31, 2023.
PCT Application No. PCT/US23/18953 International Search Report and Written Opinion dated Aug. 4, 2023.
PCT Application No. PCT/US23/11162 Invitation to Pay Additional Fees dated Apr. 17, 2023.
PCT Application No. PCT/US23/11162 International Search Report and Written Opinion dated Jun. 28, 2023.
PCT Application No. PCT/US23/18822 Invitation to Pay Additional Fees dated Jun. 26, 2023.
PCT Application No. PCT/US23/18877 Invitation to Pay Additional Fees dated Jun. 26, 2023.
PCT Application No. PCT/US2021/039371 International Search Report and Written Opinion dated Oct. 28, 2021.
PCT Application No. PCT/US23/18851 International Search Report and Written Opinion dated Oct. 3, 2023.
PCT Application No. PCT/US23/35152 International Search Report and Written Opinion dated Oct. 31, 2023.
European Search Report Application No. 21829180.5 dated Jun. 24, 2024.
Ding, W. et al., "A Novel Segmented Component Injection Scheme to Minimize the Oscillation of DC-Link Voltage Under Balanced and Unbalanced Conditions for Vienna Rectifier," IEEE Transactions on Power Electronics, vol. 34, No. 10, Oct. 2019, XP011733588, pp. 9536-9551.
Rivera, S. et al., "Electric Vehicle Charging Station Using a Neutral Point Clamped Converter With Bipolar DC Bus," IEEE Transactions on Industrial Electronics, vol. 62, No. 4, Apr. 2015, XP011574565, pp. 1999-2009.
Ye, J. et al., "Simplified Four-Level Inverter-Based Dynamic Voltage Restorer With Single DC Power Source," IEEE Access, vol. 7, Oct. 2019, XP011748357, pp. 137461-137471.
PCT Application No. PCT/US23/18826 International Search Report and Written Opinion dated Oct. 31, 2023.
U.S. Appl. No. 18/099,151, Arne Ballantine, System and Method for Controlling Hydrogen Stack, filed Jan. 19, 2023.
U.S. Appl. No. 17/360,153, Ramesh Srinivasan, Impedance Monitoring of a Modular, filed Jun. 28, 2021.
U.S. Appl. No. 18/135,431, Chockkalingam Karuppaiah, System and Method for Controlling Production, Storage, and/or Distribution of Hydrogen, filed Apr. 17, 2023.

(56) References Cited

OTHER PUBLICATIONS

U.S. Appl. No. 18/136,083, Chockkalingam Karuppaiah, System and Method for Efficiently Generating Hydrogen Using Multiple Available Power Sources, filed Apr. 18, 2023.
U.S. Appl. No. 18/135,444, Chockkalingam Karuppaiah, Hydrogen Generation System with Mission Critical Control, filed Apr. 17, 2023.
U.S. Appl. No. 18/135,571, Chockkalingam Karuppaiah, Power Distribution for a Hydrogen Generation System, filed Apr. 17, 2023.
U.S. Appl. No. 18/135,902, Chockkalingam Karuppaiah, Voltage and Frequency Response and Regulation in a Hydrogen Generation System, filed Apr. 18, 2023.
U.S. Appl. No. 18/135,724, Chockkalingam Karuppaiah, System and Method for Controlling Hydrogen Production Based on Power Production and/or Power, filed Apr. 17, 2023.
U.S. Appl. No. 18/136,093, Rasool Aghaterani, Frequency Droop to Coordinate Hydrogen Production, filed Apr. 18, 2023.
PCT Application No. PCT/US2023/011162, International Preliminary Report on Patentability dated Aug. 2, 2024.
PCT Application No. PCT/US2021/039371, International Preliminary Report on Patentability dated Jan. 5, 2023.
PCT Application No. PCT/US2023/018822, International Preliminary Report on Patentability dated Oct. 31, 2024.
PCT Application No. PCT/US2023/018934, International Preliminary Report on Patentability dated Oct. 31, 2024.
PCT Application No. PCT/US2023/018826, International Preliminary Report on Patentability dated Oct. 31, 2024.
PCT Application No. PCT/US2023/018851, International Preliminary Report on Patentability dated Oct. 31, 2024.
PCT Application No. PCT/US2023/018911, International Preliminary Report on Patentability dated Oct. 31, 2024.
PCT Application No. PCT/US2023/018877, International Preliminary Report on Patentability dated Oct. 31, 2024.
PCT Application No. PCT/US2023/018953, International Preliminary Report on Patentability dated Oct. 31, 2024.
U.S. Appl. No. 18/136,093, Non-Final Office Action dated Aug. 28, 2024.
PCT Application No. PCT/US23/35152, International Preliminary Report on Patentability dated Apr. 24, 2025.
TW Application No. 110123618, Office Letter and Search Report dated Mar. 25, 2025.
U.S. Appl. No. 17/360,153, Non-Final Office Action dated Apr. 17, 2025.
AE Application No. P6002798/2022, First Office Action dated Apr. 24, 2025.
JP Application No. 2022-578992, Notice of Reasons for Rejection dated Apr. 30, 2025.

* cited by examiner

SYSTEMS AND CIRCUITS FOR CONNECTING COMPONENTS OF A HYDROGEN PLANT TO A POWER SOURCE

CROSS-REFERENCE TO RELATED APPLICATION

This application is related to and claims priority under 35 U.S.C. § 119(e) from U.S. Patent Application No. 63/416,290, filed Oct. 14, 2022, titled "Systems and Circuits for Electrical Balance of Components of a Hydrogen Plant," the entire contents of which is incorporated herein by reference for all purposes.

FIELD OF THE DISCLOSURE

The present disclosure relates to systems and methods for controlling hydrogen generation, and more specifically for systems and circuits for connecting components to one or more power sources.

BACKGROUND

Hydrogen is a common gas that has many industrial uses, such as petroleum refining, metal treatment, food processing, and ammonia production. Although hydrogen is abundant and can be formed from a variety of renewable and non-renewable energy sources, the combustibility of hydrogen in air makes hydrogen difficult to store and ship. As a result, hydrogen is generally not amenable to large-scale production at a centralized facility for subsequent distribution across large geographical regions. Rather, hydrogen is generally used at or near the site of its production. Thus, many hydrogen producing plants consume the input resources, such as renewable power sources and nonrenewable power sources, that are available at the location or site of production. In many instances, this results in powering the components of the hydrogen from a local power grid.

SUMMARY

One aspect of the present disclosure relates to a hydrogen-generating plant comprising a plurality of alternate current (AC) to direct current (DC) converters each comprising an input in electrical communication with a power source and an output, each of the plurality of AC-DC converters converting an AC power signal from the power source to a DC power signal and a plurality of DC-DC converters each comprising an input in electrical connection to at least one of the plurality of AC-DC converters and an output in electrical communication with a load. A first subset of the plurality of DC-DC converters is connected in parallel to an output of a first AC-DC converter and a second, distinct subset of the plurality of DC-DC converters is connected in parallel to an output of a second AC-DC converter to electrically isolate the first AC-DC converter from the second AC-DC converter.

Another aspect of the present disclosure relates to a method for operating a hydrogen generator. The method may include the operations of electrically connecting a plurality of alternate current (AC) to direct current (DC) converters to a power source, electrically connecting a first subset of a plurality of DC-DC converters between an output of a first AC-DC converter of the plurality of AC-DC converters and a load circuit, the first subset of the plurality of DC-DC converters in parallel to each other, and electrically connecting a second subset of the plurality of DC-DC converters between an output of a second AC-DC converter of the plurality of AC-DC converters and the load circuit, the second subset of the plurality of DC-DC converters in parallel to each other. The method may electrically isolate the first AC-DC converter from the second AC-DC converter.

Some aspects of the present disclosure relate to the plurality of AC-DC converters comprising non-isolated, bi-directional AC-DC converters, the plurality of DC-DC converters comprising isolated, uni-directional DC-DC converters, and/or the load comprising an electro-chemical load, such as at least one electrolyzer.

Some aspects of the present disclosure relate to the power source being one of a grid power source or a renewable power source.

Still some aspects of the present disclosure relate to a transformer comprising a primary winding in electrical communication with the power source and a secondary winding in electrical communication with one or more auxiliary loads. The transformer may be an adjustable transformer comprising one or more taps on the primary winding or the secondary winding to adjust a windings ratio of the transformer. In some other aspects, the transformer may be a solid-state transformer.

In some aspects of the present disclosure, the one or more auxiliary loads comprise three-phase loads and single-phase loads and/or the transformer may be configured to provide power to the three-phase loads and single-phase loads. An uninterruptible power supply may also be in electrical communication with the one or more auxiliary loads.

BRIEF DESCRIPTION OF THE FIGURES

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
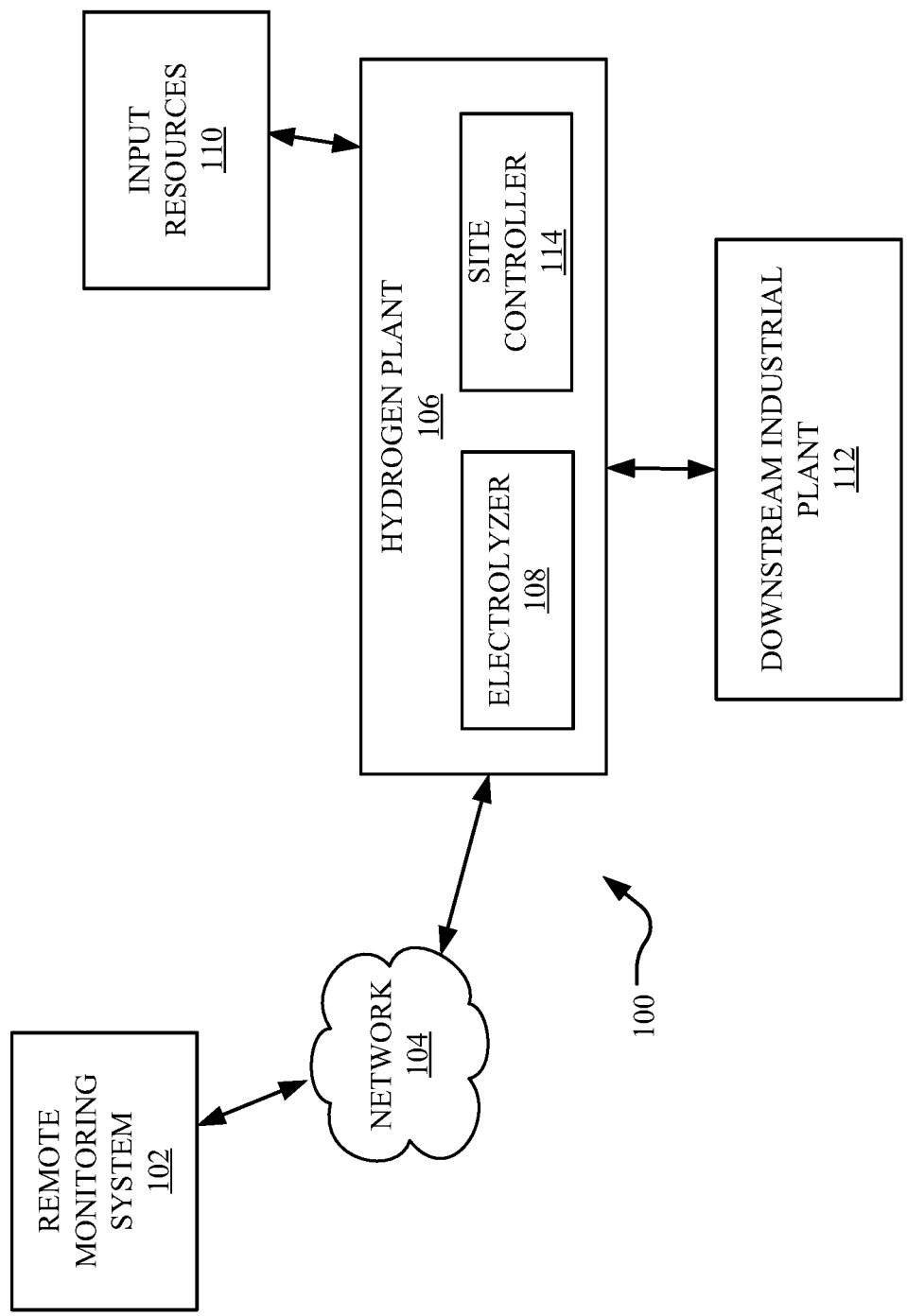
FIG. 1 shows an exemplary environment for hydrogen production according to aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Thus, references to one or an embodiment in the present disclosure can be references to the same embodiment or any embodiment; and such references mean at least one of the embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Described herein are systems and circuits for connecting components of a hydrogen plant to a power grid to power the components in an efficient manner. In one implementation, power-side alternate current (AC) to direct current (DC) converters may be connected to a source power grid without the need for an isolation transformer by providing separate buses between the power-side AC-DC converters and load-side DC-DC converters instead of a shared DC bus between the converters. By separating the DC-DC converters of the grid interface circuit among the power-side AC-DC converters, isolation of the power-side converters may be maintained while providing the necessary power signal to the load. Such a configuration is an improvement over previous circuits as an isolation transformer may be a very large and expensive component of the circuit, thereby improving the efficiency and cost of connecting the hydrogen plant components to the power grid by separating the output of the power-side converters to an isolated subset of the load-side converters.

Other implementations for connecting components of a hydrogen plant to a power grid may include an adjustable transformer, such as a tappable transformer or an autotransformer, to connect any number of auxiliary loads of the plant to the power grid. The adjustable transformer may provide for various types of auxiliary load devices to connect to the grid at the same time, including both three-phase devices and one-phase devices. Also, the hydrogen plant may not be dependent on the neutral/auxiliary power support. Rather, single-phase loads or devices can be fed by the local neutral created using the (tappable) transformer/autotransformer. For example, the hydrogen plant may be located in various locations around the world and connect to a power grid that is local to the site. However, due to the (tappable) transformer, the auxiliary loads can be powered with any grid voltage. Changes to a grid voltage or main power architecture will also not demand changes to the circuit downstream of the transformer. As such, installation of the hydrogen plant can be easily adopted to wide grid networks, as the isolated secondary windings of the transformer gives the flexibility to have a grounding mechanism, as per the local grid codes or designer choice.

FIG. 1 shows an exemplary environment 100 for hydrogen production according to aspects of the present disclosure. The environment 100 may include more or fewer components than illustrated in FIG. 1, which is included to provide context for the operations and configurations of the plant modeling tool described herein. Additional components and/or configurations of the hydrogen production environment 100 are described in greater detail below.

The environment 100 may include a hydrogen plant 106 designed and configured to generate hydrogen. The hydrogen plant 106 may include a system housed in a container, outdoor-rated cabinets, or multiple systems contained within a plant site. In one implementation, the hydrogen plant 106 may be a clean hydrogen facility. Such clean hydrogen facility installations are at the early stages of the industry with a significant market growth projection that may scale to much larger production capacity and higher integration adaptation to the upstream and downstream required configurations over time.

Often, clean hydrogen facilities 106 generate hydrogen through a process known as electrolysis. In general, electrolysis (i.e., in the context of zero-carbon production of hydrogen) is a rapidly growing and enabling technology that provides a preferable and sustainable alternative to fossil fuels and the resulting environmentally harmful $CO_2$ emissions. Electrolysis is the process of using electricity to split water into hydrogen and oxygen, with this reaction taking place in a unit called an "electrolyzer" 108. Through the electrolysis process, the electrolyzer 108 creates hydrogen gas. Most electrolyzers 108 include an anode and a cathode separated by an electrolyte in the presence of water. As energy, such as a direct-current (DC) power, is applied, the water molecules react at the anode to form oxygen and positively charged hydrogen ions. The hydrogen ions flow through the electrolyte to the cathode to bond with electrons and form hydrogen gas. The leftover oxygen may be released into the atmosphere or can be captured or stored to supply other industrial processes or even medical gases, in some cases. The hydrogen gas can either be stored as a compressed gas or liquefied, and since hydrogen is an energy carrier, it can be used to power such hydrogen fuel cell electric applications as trains, buses, trucks, or data centers. In some instances, the generated hydrogen may be provided to one or more downstream industrial plants 112 for asset production, such as steel, cement, oil, fertilizer, and the like. In one example, liquefied hydrogen may be piped to a downstream industrial plant 112 or carried by tanker. In another example, hydrogen gas may be provided to one or more downstream industrial plants 112.

Electrolyzers 108 can range in size from small equipment, well-suited for modest-scale distributed hydrogen production, to large-scale, central production facilities, capable of being sequenced directly to renewable or other non-greenhouse-gas-emitting forms of electricity production. Electrolyzers 108 offer a route to produce clean hydrogen to power hydrogen fuel cells, supply industrial processes or produce green chemicals like fertilizers, renewable natural gas, and methanol. Some electrolyzers 108 may be configured through a connection of various electrolytic cells, with each cell comprising a small electrolyzer. This configuration is sometimes referred to as an electrolyzer stack. In one implementation, the electrolyzer stack may include the multiple cells connected in series in a bipolar design, although other configurations are possible.

As should be appreciated, the hydrogen plant 106 may utilize several input resources 110 for generation of hydrogen. For example, various forms of energy sources (grid electricity, natural gas, wind, solar, hydro, etc.) may be provided to the hydrogen facility 106 for use by the components of the plant. Other input resources 110, such as water for use by the electrolyzer 108 may also be provided to the hydrogen plant 106 for producing hydrogen.

Once a hydrogen plant 106 is built, control over the various components, systems, programs, and/or sensors of the plant may be executed through a site controller 114. For example, a Supervisory Control and Data Acquisition (SCADA) control system may be integrated with the hydrogen plant 106 to monitor plant conditions and/or control various aspects or parameters of the components of the plant. In one particular instance, a sensor may be associated with a pipe containing gas generated from the electrolysis process to measure to pressure within the pipe. The sensor may provide readings or measurements to the site controller 114 which may, in response, adjust one or more valves within the gas piping system to adjust the pressure within the piping system. In general, any adjustable aspect or parameter of the hydrogen plant, the components within the plant, input resources 110, sensors, executable program associated with the plant, or any other aspect of the hydrogen plant 106 may be adjustable by the site controller 114. In some instances, the site controller 114 may also include an interface through which a plant operator may access components of the plant 106 and make one or more adjustments to the components. In another instance, the site controller 114 may be configured to automatically adjust the parameters or aspects of the hydrogen plant 106 based on inputs from one or more sensors or any other source of operational data of the plant.

The environment 100 may also, in some instances, include a remote monitoring system 102 that communicates with the hydrogen plant 106 through a network 104 connection. In one example, the remote monitoring system 102 may be in communication with the electrolyzer 108 to monitor one or more operational states of the electrolyzer and adjust one or more parameters of the electrolyzer accordingly. The network 104 connects the remote monitoring system 102 to one or more communication interface devices of the hydrogen plant 106 and may be configured to transmit and/or receive information between the remote monitoring system and other devices by way of one or more wired or wireless communication networks or connections. Examples of such networks or connections include, without limitation, wireline communication over serial or Ethernet in copper or fiber medium or wireless communication over USB, Wi-Fi, Bluetooth, Zigbee mesh network, or a cellular wireless network. One or more such communication interface devices may be utilized to communicate with the remote monitoring system 102 and/or the hydrogen plant 106, either directly over a point-to-point communication path, over a wide area network (WAN) (e.g., the Internet), over a local area network (LAN), over a cellular (e.g., third generation (3G), fourth generation (4G), fifth generation (5G)) network, or over another communication means.

Figure 2A:
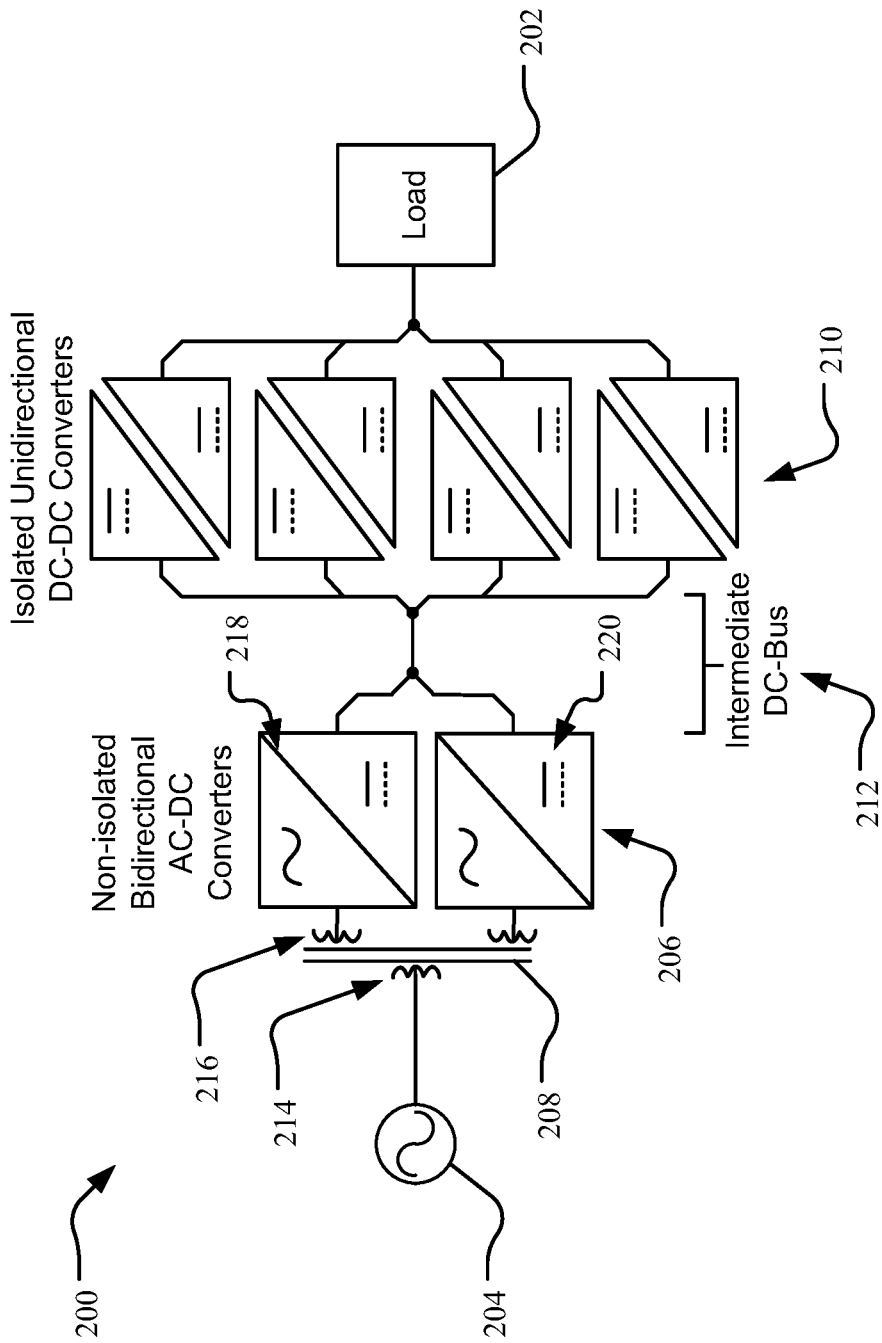
FIG. 2A shows a first exemplary circuit for connecting hydrogen plant components to a power grid according to aspects of the present disclosure.

As mentioned above, one of the input resources 110 provided to the hydrogen plant 106 may be some type of power source, such as a nonrenewable power source (e.g., a power grid connection) or a renewable power source (e.g., solar or wind power sources). FIG. 2A shows a first exemplary circuit for connecting hydrogen plant components to a power grid according to aspects of the present disclosure. In general, the components of the hydrogen plant 106 are represented in FIG. 2A as the load 202. Thus, the load 202 may include some or all of the components of the hydrogen plant 106, including the electrolyzer stack 108. In other implementations, the load 202 may not be associated with a hydrogen plant specifically, but may be any electro-chemical load that receives constant current and/or constant voltage. For the hydrogen plant 106 example, the plant may connect to a power grid 204 (represented as 3-phase grid in FIG. 2A) to power the components of the plant. In one implementation, the power grid 204 may provide an alternating current (AC) power signal, such as a three-phase AC signal. Many components of the load 202, however, may require a direct current (DC) power signal. Thus, a series of converter devices may be connected between the power source 204 and the load 202 to provide a DC power signal, among other advantages.

In the implementation illustrated in FIG. 2A, one or more AC-DC converters 206 (also referred to herein as "power source converters") may be connected to power source 204 through an isolation transformer 208. The purpose of the isolation transformer 208 is discussed in more detail below. The number of power source converters 206 may vary depending on the power requirements of the load 202. The power source converters 206 may be connected in parallel such that the such that the inputs to the AC-DC converters are connected through the isolation transformer 208 and the outputs are connected through an intermediate DC bus 212. The outputs of the power source converters 206 may connect, through the intermediate DC bus 212, to one or more DC-DC converters 210 (also referred to herein as "load-side converters"). The DC-DC converters 210 may also be connected in parallel such that each input is connected to the intermediate DC bus 212 and the output of each DC-DC connects to the load 202. In one implementation, the power source converters 206 may include one or more non-isolated, bidirectional, AC-DC converters. In the same or other implementation, the load-side converters 210 may include one or more isolated, unidirectional DC-DC converters. Other types of converters are contemplated for use in the circuit 200 in the same or different configurations.

As mentioned, the power source converters 206 connect to the power grid 204 via isolation transformer 208. In one implementation, the isolation transformer 208 may include a primary winding 214 in electrical communication to receive the power signal from the grid 204 and two secondary windings 216 in electrical communication with the two power source converters 206. In general, one concern for parallel connected power source converters 206 is that current may circulate between the units. For example, when the power source converters 206 share an input and an output connection, current from a first power source converter 218 may be provided to a second power source converter 220, and vice versa, such that current may circulate between the connected converters. To limit the circulating current between the power source converters 220, additional passive components may be included in the circuit 200, such as large filter inductors and/or current sharing inductors. However, in cases in which the power converter ratings of the power source converters 206 are large, these solutions become more inefficient, due to high cost for the components and the potential power loss. Also, circulating currents may be more pronounced in some circumstances due to lower filter inductors, along with low switching frequency operation demanded by power devices and converters. Further, hard switch parallel operating in which the converters are paralleled may require derating due to nonlinear and parasitic effects that creates differences in the current sharing. To address these inefficiencies, some circuits may include isolation among the converters, which is typically added at the input side. For example, circuit 200 includes isolation transformer 208 to provide isolation at the input side to the power source converters 206. The power frequency isolation transformer 208 enables use of a large number of power source AC/DC converters 206 with a common output, such as intermediate DC bus 212. The isolated converters 206 may be treated as each unit delivering power to the load 202 without having any implication on other power source converters 206 connected to the same output 212.

Figure 2B:
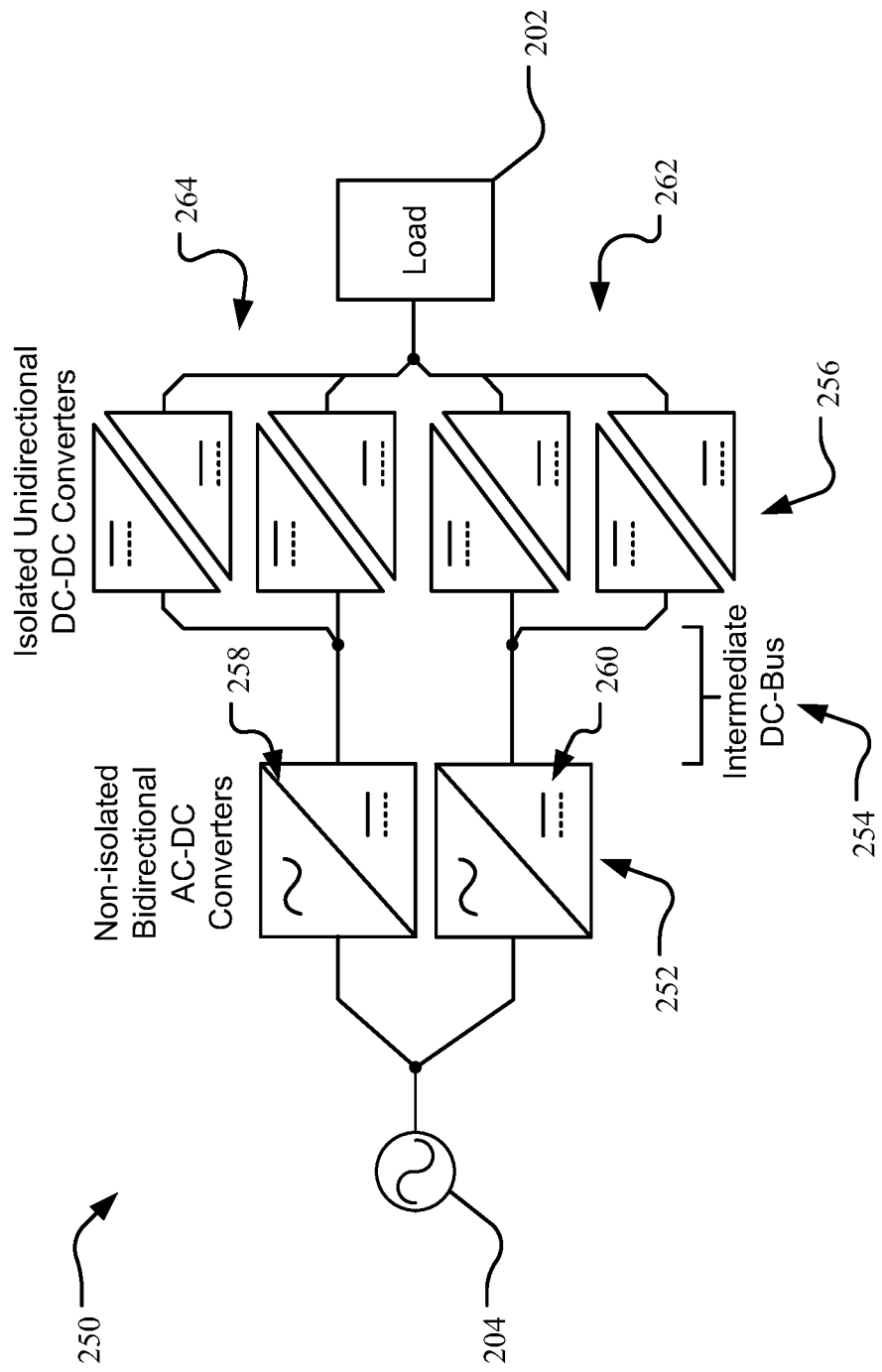
FIG. 2B shows a second exemplary circuit for connecting hydrogen plant components to a power grid according to aspects of the present disclosure.

In some circumstances, isolation of the power source converters 206 may be avoided. For example, the use of high-frequency isolated DC-DC converters 210 to provide high currents to the load 202 may be used to avoid the problems associated with paralleling of the AC-DC power source converters 206. FIG. 2B shows a first exemplary circuit 250 for connecting hydrogen plant components to a power grid according to aspects of the present disclosure. Many of the components of the circuit 250 of FIG. 2B are the same as described above, such as the grid power source 204 and the load 202. Also similar to above, the power source 204 may be connected to one or more power source converters 252, which may be non-isolated bidirectional AC-DC converters. One or more load-side converters 256 may also be connected between the power source converters 252 and the load 202. In one particular implementation, the load-side converters 256 may be isolated bidirectional DC-DC converters. In this circuit 250, however, the output of the power source converters 252 may not be connected by the intermediate DC bus 254. Rather, the output of the power source converters 252 may be isolated while providing the required power signal to the load-side converters 256.

In this configuration, the load-side converters 256 may be divided between the power source converters 252 such that the output from each power source converter is provided to a subset of the load-side converters. For example, power source converter 258 may provide the converted power signal to load-side converters 264, while power source converter 260 may provide the converted power signal to load-side converters 262. In this manner, the output of the power source converters 252 may not be shared on a common intermediate DC bus, but are instead connected to one or more load-side converters 256 over separate intermediate DC buses 254. Through the use of the separate DC buses 254 to provide the converted power signal to the load-side converters 256, isolation of the power source converters 252 is maintained without the need of an isolation transformer. Rather, each of the power source converters 252 may connect directly to the power grid 204. This configuration is an improvement over previous circuits as the isolation transformer may be a very large and expensive component of the circuit, improving the efficiency and cost of connecting the hydrogen plant components to the power grid 204 by separating the output of the power source converters 252 to a subset of the load-side converters 256.

In addition, the configuration of circuit 250 may be scaled based on the power requirements of the components of the hydrogen plant, without dependency on the isolation transformer 208. For example, assume a power rating of the load-side DC-DC converters 256 of $P_{DC\text{-}DC}$ and a number (n) of such converters in each block. Also assume a power rating of the power source AC-DC converters 252 of $P_{AC\text{-}DC}$ and a number (m) of such converters. For example, in the circuit 250 of FIG. 2B, n=2 as each converter block includes two DC-DC load-side converters to one AC-DC power source converter. In this case, $P_{AC\text{-}DC} >= n*P_{DC\text{-}DC}$.

The number m of power source converters 252 needed for a circuit may be calculated based on the required load power. For example, for a power rating of the load at $P_{LOAD}$, the number of AC-DC power source converters 252 may be based on the equation $m=P_{LOAD}/P_{AC\text{-}DC}$. Thus, for an application of 300 kW power delivery and assuming the number of load-side converters 256 is two per power source converter, seven AC-DC power source converters 252 may be utilized in the circuit. For an application of 400 kW power delivery and again assuming the number of load-side converters 256 is two per power source converter, nine AC-DC power source converters 252 may be utilized in the circuit. In this manner, the configuration of power source converters 252 is highly scalable based on the power rating requirement of the load 202 to adjust to all types of loads and components of the hydrogen plant.

Figure 3:
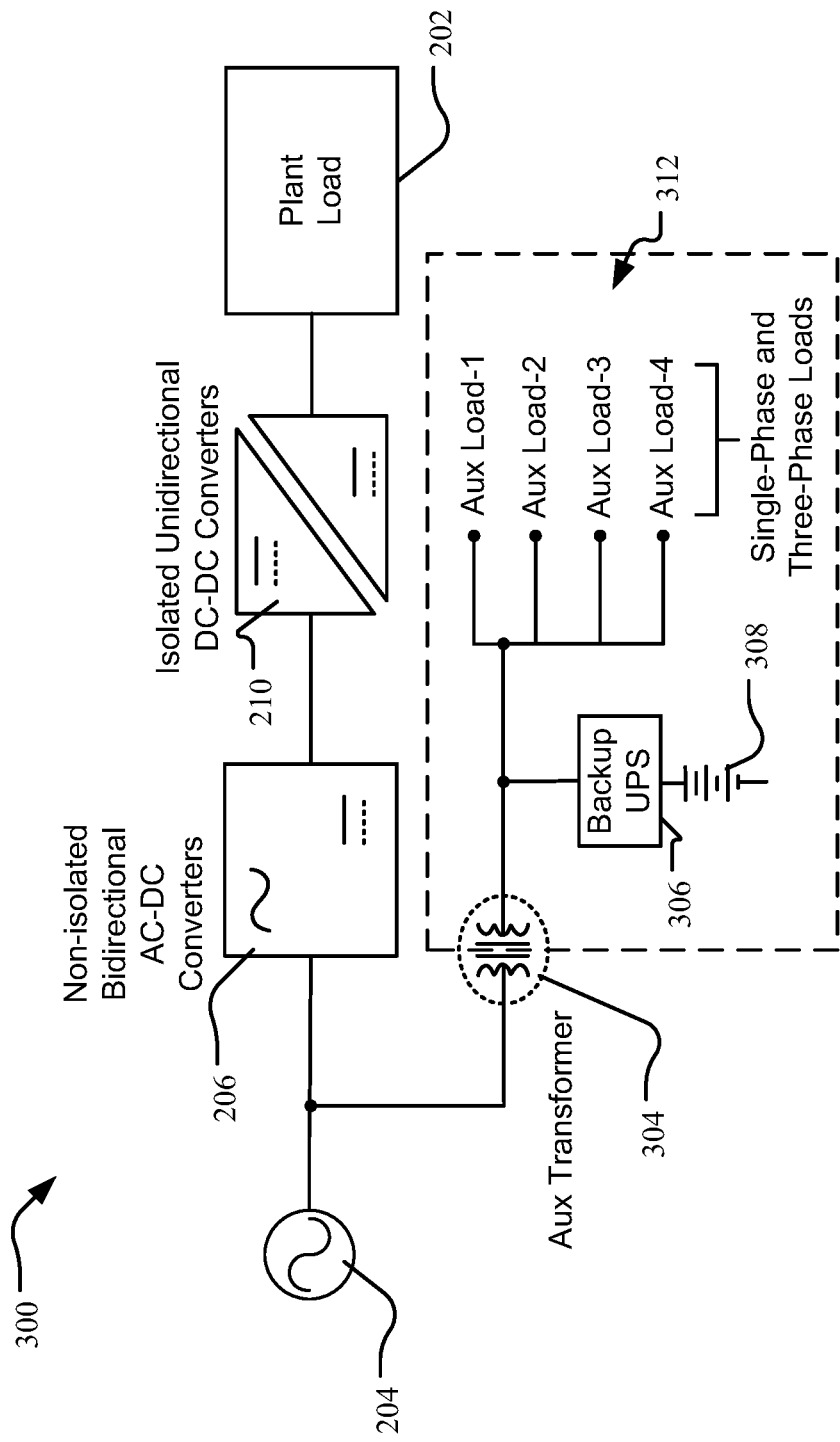
FIG. 3 shows an exemplary circuit for connecting auxiliary load components of a hydrogen plant to a power grid according to aspects of the present disclosure.

Other components of the hydrogen plant 106 may also connect to the grid power but not require the high current or voltage of the load 202 discussed above. For example, one or more auxiliary loads (such as pumps, fans, telemetry devices etc.) may be used within the hydrogen plant 106 and powered from the power grid 204. However, such auxiliary components may be decoupled from the main load (plant load 202) and the large power converters discussed above. Decoupling the auxiliary components from the large power converters provides a more efficient manner to power such devices. FIG. 3 shows an exemplary circuit 300 for connecting auxiliary load components 312 of a hydrogen plant to a power grid according to aspects of the present disclosure. In general, auxiliary load devices 312 may require lower current and/or voltage to operate compared to the plant load devices 202. However, the auxiliary load devices 312 may require three-phase power or one-phase power. Thus, the circuit 300 of FIG. 3 may include one or more components to provide power in three-phases or in one-phase power. In addition, the circuit 300 may include components that provides for connection to various types of grid power 204. For example, the hydrogen plant 106 discussed above may be located in various locations around the world and connect to a power grid that is local to the site. Power grids around the world provide different levels of power, such as the United States providing a 120 volt AC power signal, several European countries providing a 230 volt AC power signal, and Japan providing a 100 volt AC power signal. Thus, the components of the connection circuit 300 of FIG. 3 may be selected and/or configured such that connection may be made to various types of power grids.

The circuit 300 may include several components described above, such as a connection to a power grid 204, one or more AC-DC converters 206, one or more DC-DC converters 210, and a plant load 202, which may include one or more electrolyzer devices. In addition, one or more auxiliary load devices 312 may receive power from the power grid 204. To provide a power signal to the auxiliary loads 312 with the flexibility to connect to various types of grid power signals, a transformer 304 may connect to the power grid 204. In one implementation, the transformer 304 may be a tappable transformer, such as an isolation or auto-type transformer, that is configurable for the various grid sources to bring the grid voltage level to a suitable range for the auxiliary loads 312. For example, the tappable transformer 304 may include a mechanism to allow for variable turn ratios to be selected, perhaps through a mechanical switching device. Other examples may utilize an automatic system to adjust the turns ratio of the transformer 304, with fixed and/or multiple taps. The tap changer may connect to any number of access points on the transformer, either along the primary or secondary side, to adjust the turns ratio of the device and the transformation of the input power signal to the output power signal. In other implementations, the transformer 304 may have fixed primary and/or secondary windings with isolation or have adjustable taps on one or both windings. In another implementation, the transformer 304 may be a solid-state transformer comprising one or more power electronic components which provide the same functionality of the tappable transformer described above. Such a solid-state transformer may include high-frequency isolation. Further, the transformer 304 may be configured to provide output power from the transformer 304 on each of the three-phases of the power signal for power to each of the auxiliary load devices 312. In one particular implementation, the transformer 304 may connect to the power grid 204 over a three-wire connection and output a four-wire connection.

In addition to powering the auxiliary loads 312 from the local power grid 204, the circuit 300 may include components to ensure power to the devices if grid power is lost. In particular, the circuit 300 may include an uninterruptible power supply (UPS) 306 connected to the auxiliary loads 312 that may store and provide power to the auxiliary loads when needed. The UPS 306 may receive the stored power from the transformer 304 and/or a battery 308 connected to the UPS, in some instances. In other implementations, the UPS 306 may be connected to a continuous generator (such as a fuel cell generator, a photovoltaic generator, a piston-type engine generator, etc.) may be connected in parallel to or instead of the battery 308 to provide power to the UPS. A bypass switch (not shown) may be included that alternately connects the auxiliary loads 312 to the transformer 304 or the UPS 306 based on a desired source of power. In general, the UPS 306 operates in a stand-by mode until loss of power from the grid source 204 is detected. Upon detection, the switch 310 may be opened and power is provided to the auxiliary loads 312 from the UPS 306. In this manner, power may continually be provided to the auxiliary loads 312, even during a power loss of the grid source 204 or shutdown of the other components of the hydrogen plant.

The components of the circuit 300 of FIG. 3 may provide power to the auxiliary loads 312 and allow them to operate without the grid power 204 for reasons such as data logging, freeze protection, hazard mitigation, and the like. The auxiliary leg of the circuit 300 provides the necessary power to the auxiliary loads 312 outside of the 5×-10× larger scale of the plant load 202 power. Further, a right-sizing and design of the power channels for their different needs improves the efficiency of the circuit 300. For example, providing the UPS 306 downstream of the transformer 304 provides fault tolerance functionality to the circuit.

As mentioned above, the circuit 300 may operate to provide power on each phase of the power signal. This allows for various types of auxiliary load devices 312 to connect to the power provided by the transformer 304, such as three-phase devices or one-phase devices. Further, these lower voltage devices may comprise high frequency, high efficiency configurations to improve the operation of the circuit 300 and hydrogen plant 106 in general. In one implementation, the devices of the circuit 300 may include Gallium Nitride (GaN)-type components and designs to improve the functionality of the circuit 300. In this manner, the overall hydrogen plant does not depend on the neutral/auxiliary power support. Rather, single-phase loads or devices can be fed by the local neutral created using the (tappable) transformer/autotransformer 304. Further, due to the (tappable) transformer 304, auxiliary load 312 can work with any grid voltage. Changes to a grid voltage or main power architecture will not demand changes to the circuit 300 downstream of the transformer 304. As such, installation of the hydrogen plant can be easily adopted to wide grid networks, for example the corner grounding in Japan, as the isolated secondary of the transformer 304 gives the flexibility to have a grounding mechanism, as per the local grid codes or designer choice.

In some instances, one or more auxiliary load devices 312 may be powered directly from the battery 308 or other power supply, such as the continuous generators listed above. For example, the battery 308 or generators may supply power to auxiliary devices which have built-in energy storage at the lower voltage (such as 24V) level. Power may be provided to these low-voltage auxiliary device via a simple diode circuit or other power interface circuit. In addition, elements of the battery, 308, UPS 306, and/or generators may be interlocked with one or more safety features of the plant load 202 to prevent enabling the power supplies until certain permissive signals are seen by a control computer or embedded control's safety logic (such as confirmation of successful ventilation purge).

EXEMPLARY EMBODIMENTS

Embodiment 1

A hydrogen-generating plant comprising:
a plurality of alternate current (AC) to direct current (DC) converters each comprising an input in electrical communication with a power source and an output, each of the plurality of AC-DC converters converting an AC power signal from the power source to a DC power signal; and
a plurality of DC-DC converters each comprising an input in electrical connection to at least one of the plurality of AC-DC converters and an output in electrical communication with a load;
wherein a first subset of the plurality of DC-DC converters is connected in parallel to an output of a first AC-DC converter and a second, distinct subset of the plurality of DC-DC converters is connected in parallel to an output of a second AC-DC converter to electrically isolate the first AC-DC converter from the second AC-DC converter.

Embodiment 2

The hydrogen-generating plant of embodiment 1 wherein the plurality of AC-DC converters comprises non-isolated, bi-directional AC-DC converters.

Embodiment 3

The hydrogen-generating plant of embodiment 1 or embodiment 2 wherein the plurality of DC-DC converters comprises isolated, uni-directional DC-DC converters.

Embodiment 4

The hydrogen-generating plant of any one of embodiments 1-3 wherein the load is an electro-chemical load.

Embodiment 5

The hydrogen-generating plant of any one of embodiments 1-4 wherein the load comprises at least one electrolyzer.

Embodiment 6

The hydrogen-generating plant of any one of embodiments 1-5 wherein the power source is one of a grid power source or a renewable power source.

Embodiment 7

The hydrogen-generating plant of any one of embodiments 1-6 further comprising: a transformer comprising a primary winding in electrical communication with the power source and a secondary winding in electrical communication with one or more auxiliary loads.

Embodiment 8

The hydrogen-generating plant of embodiment 7 wherein the transformer is an adjustable transformer comprising one or more taps on the primary winding or the secondary winding to adjust a windings ratio of the transformer.

Embodiment 9

The hydrogen-generating plant of embodiment 7 or embodiment 8 wherein the transformer is a solid-state transformer.

Embodiment 10

The hydrogen-generating plant of any one of embodiments 7-9 wherein the one or more auxiliary loads comprise three-phase loads and single-phase loads.

Embodiment 11

The hydrogen-generating plant of embodiment 10 wherein the transformer is configured to provide power to the three-phase loads and single-phase loads.

Embodiment 12

The hydrogen-generating plant of any one of embodiments 7-11 further comprising: an uninterruptible power supply in electrical communication with the one or more auxiliary loads.

Embodiment 13

A method for operating a hydrogen generator, the method comprising:

electrically connecting a plurality of alternate current (AC) to direct current (DC) converters to a power source;

electrically connecting a first subset of a plurality of DC-DC converters between an output of a first AC-DC converter of the plurality of AC-DC converters and a load circuit, the first subset of the plurality of DC-DC converters in parallel to each other; and electrically connecting a second subset of the plurality of DC-DC converters between an output of a second AC-DC converter of the plurality of AC-DC converters and the load circuit, the second subset of the plurality of DC-DC converters in parallel to each other, wherein the first AC-DC converter is electrically isolated from the second AC-DC converter.

Embodiment 14

The method of embodiment 13 wherein the plurality of AC-DC converters comprises non-isolated, bi-directional AC-DC converters.

Embodiment 15

The method of embodiment 13 or embodiment 14 wherein the plurality of DC-DC converters comprises isolated, uni-directional DC-DC converters.

Embodiment 16

The method of any one of embodiments 13-15 wherein the load comprises at least one electrolyzer.

Embodiment 17

The method of any one of embodiments 13-16 further comprising: electrically connecting one or more auxiliary loads to the power source via a transformer.

Embodiment 18

The method of embodiment 17 wherein the one or more auxiliary loads comprise three-phase loads and single-phase load.

Embodiment 19

The method of embodiment 17 or embodiment 18 wherein the transformer is configured to provide power to the three-phase loads and single-phase loads

Embodiment 20

The method of any one of embodiments 17-19 further comprising: electrically connecting a bypass switch between the one or more auxiliary loads and an uninterruptible power supply (UPS), the bypass switch to switch power to the one or more auxiliary loads from the power source to the UPS in response to a loss of power by the power source.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

What is claimed is:

1. A hydrogen-generating plant comprising:
   a plurality of non-isolated, bi-directional alternate current (AC) to direct current (DC) converters each comprising an input in electrical communication with a power source and an output, each of the plurality of AC-DC converters converting an AC power signal from the power source to a DC power signal;
   a first plurality of isolated, uni-directional DC-DC converters each comprising an input in electrical connection to an output of a first one of the plurality of AC-DC converters and an output in electrical communication with a hydrogen-generating device; and
   a second plurality of isolated, uni-directional DC-DC converters each comprising an input in electrical connection to an output of a second one of the plurality of AC-DC converters and an output in electrical communication with the hydrogen-generating device;
   wherein the second plurality of DC-DC converters are distinct from the first plurality of DC-DC converters to electrically isolate the first AC-DC converter from the second AC-DC converter.

2. The hydrogen-generating plant of claim 1 wherein the hydrogen-generating device comprises an electro-chemical load.

3. The hydrogen-generating plant of claim 1 wherein the hydrogen-generating device comprises at least one electrolyzer.

4. The hydrogen-generating plant of claim 1 wherein the power source is one of a grid power source or a renewable power source.

5. The hydrogen-generating plant of claim 1 further comprising:
   a transformer comprising a primary winding in electrical communication with the power source and a secondary winding in electrical communication with one or more auxiliary loads.

6. The hydrogen-generating plant of claim 5 wherein the transformer is an adjustable transformer comprising one or more taps on the primary winding or the secondary winding to adjust a windings ratio of the transformer.

7. The hydrogen-generating plant of claim 5 wherein the transformer is a solid-state transformer.

8. The hydrogen-generating plant of claim 5 wherein the one or more auxiliary loads comprise three-phase loads and single-phase loads.

9. The hydrogen-generating plant of claim 8 wherein the transformer is configured to provide power to the three-phase loads and single-phase loads.

10. The hydrogen-generating plant of claim 5 further comprising:
    an uninterruptible power supply in electrical communication with the one or more auxiliary loads.

11. A method for operating a hydrogen generator, the method comprising:
    electrically connecting a plurality of non-isolated, bi-directional alternate current (AC) to direct current (DC) converters to a power source, each of the plurality of AC-DC converters converting an AC power signal from the power source to a DC power signal;
    electrically connecting a first subset of a plurality of isolated, uni-directional DC-DC converters between an output of a first AC-DC converter of the plurality of AC-DC converters and a hydrogen-generating device, the first subset of the plurality of DC-DC converters in parallel to each other; and
    electrically connecting a second subset of the plurality of DC-DC converters between an output of a second AC-DC converter of the plurality of AC-DC converters and the hydrogen-generating device, the second subset of the plurality of DC-DC converters in parallel to each other,
    wherein the second subset of the DC-DC converters is distinct from the first subset of the DC-DC converters to electrically isolate the first AC-DC converter from the second AC-DC converter.

12. The method of claim 11 wherein the hydrogen-generating device comprises at least one electrolyzer.

13. The method of claim 11 further comprising:
    electrically connecting a transformer between one or more auxiliary loads and the power source.

14. The method of claim 13 wherein the one or more auxiliary loads comprise three-phase loads and single-phase load.

15. The method of claim 13 wherein the transformer is configured to provide power to the three-phase loads and single-phase loads.

16. The method of claim 13 further comprising:
electrically connecting the one or more auxiliary loads and to an uninterruptible power supply (UPS) to provide power to the one or more auxiliary loads from the UPS in response to a loss of power by the power source.

\* \* \* \* \*